United States Patent
Marlett et al.

(10) Patent No.: US 10,161,285 B2
(45) Date of Patent: Dec. 25, 2018

(54) METHOD AND APPARATUS FOR MONITORING PARTICULATE MATTER IN AN EXHAUST GAS FEEDSTREAM

(71) Applicant: GM GLOBAL TECHNOLOGY OPERATIONS LLC, Detroit, MI (US)

(72) Inventors: Chad E. Marlett, Plymouth, MI (US); Cristian Taibi, Turin (IT); Luca Giuseppe Pairolero, Cascine Vica Rivoli (IT)

(73) Assignee: GM Global Technology Operations LLC, Detroit, MI (US)

( * ) Notice: Subject to any disclaimer, the term of this patent is extended or adjusted under 35 U.S.C. 154(b) by 121 days.

(21) Appl. No.: 15/147,393

(22) Filed: May 5, 2016

(65) Prior Publication Data

US 2017/0321587 A1    Nov. 9, 2017

(51) Int. Cl.
| | |
|---|---|
| *F01N 11/00* | (2006.01) |
| *F01N 3/027* | (2006.01) |
| *F01N 9/00* | (2006.01) |
| *F01N 3/20* | (2006.01) |

(Continued)

(52) U.S. Cl.
CPC ............ *F01N 11/002* (2013.01); *F01N 3/021* (2013.01); *F01N 3/027* (2013.01); *F01N 3/035* (2013.01); *F01N 3/208* (2013.01); *F01N 3/2066* (2013.01); *F01N 9/002* (2013.01); *F01N 9/005* (2013.01); *F01N 11/00* (2013.01); *F01N 2550/04* (2013.01); *F01N 2560/021* (2013.01); *F01N 2560/05* (2013.01); *F01N 2560/08* (2013.01); *Y02T 10/24* (2013.01); *Y02T 10/47* (2013.01)

(58) Field of Classification Search
CPC ............ F01N 2560/05; F01N 2560/12; F01M 9/002; G01N 15/0606
See application file for complete search history.

(56) References Cited

U.S. PATENT DOCUMENTS

| | | | |
|---|---|---|---|
| 7,568,376 B2* | 8/2009 | Strohmaier | ......... F02D 41/1466 702/100 |
| 8,035,404 B2* | 10/2011 | Schnell | .............. G01N 15/0656 324/71.4 |

(Continued)

*Primary Examiner* — Mark Laurenzi
*Assistant Examiner* — Jason Sheppard
(74) *Attorney, Agent, or Firm* — Quinn IP Law

(57) ABSTRACT

An exhaust aftertreatment system includes a particulate filter element and a particulate matter sensor that is disposed to monitor the exhaust gas feedstream downstream of the particulate filter element. A method for monitoring the exhaust gas feedstream includes determining a temperature associated with the particulate matter sensor and monitoring engine operation and the exhaust aftertreatment system. A magnitude of ammonia is determined in the exhaust gas feedstream proximal to the particulate matter sensor based upon the monitoring of the engine operation and the exhaust aftertreatment system. An initial reading is determined from the particulate matter sensor and is adjusted based upon the magnitude of ammonia in the exhaust gas feedstream proximal to the particulate matter sensor and the temperature of the particulate matter sensor. A magnitude of particulate matter in the exhaust gas feedstream is determined based upon the adjusted initial reading from the particulate matter sensor.

10 Claims, 2 Drawing Sheets

(51) Int. Cl.
*F01N 3/021* (2006.01)
*F01N 3/035* (2006.01)

(56) References Cited

U.S. PATENT DOCUMENTS

| | | | |
|---|---|---|---|
| 8,122,711 B2* | 2/2012 | Schmidt | F01N 11/00 60/297 |
| 2007/0089478 A1* | 4/2007 | Wirth | F01N 9/002 73/1.06 |
| 2016/0376972 A1* | 12/2016 | Hagimoto | F01N 3/103 60/276 |

* cited by examiner

METHOD AND APPARATUS FOR MONITORING PARTICULATE MATTER IN AN EXHAUST GAS FEEDSTREAM

TECHNICAL FIELD

This disclosure relates to internal combustion engines that are fluidly coupled to exhaust aftertreatment systems, and methods for their control.

BACKGROUND

Internal combustion engines fluidly couple to exhaust aftertreatment systems that purify exhaust gases generated as byproducts of combustion. Exhaust aftertreatment systems may include oxidation catalysts, reduction catalysts, selective catalytic reduction catalysts and particulate filters. Byproducts of combustion may include unburned hydrocarbons, carbon monoxide, nitrides of oxide, which may be referred to as NOx molecules, and particulate matter. Operation may be monitored by one or more sensing devices that are disposed in the exhaust gas feedstream, including, e.g., a NOx sensor. Operation may also be determined employing simulation models that dynamically execute during operation.

Selective catalytic reduction catalysts (SCRs) may employ reductants for reducing NOx molecules to elemental nitrogen. One known reductant is urea, which may be transformed in an exhaust system into ammonia (NH3). The reductant may be injected into the exhaust gas feedstream upstream of one or multiple selective catalytic reduction catalysts, and may be stored on a surface or otherwise captured for use in reducing NOx molecules to elemental nitrogen and water.

Signal output from a sensor that is configured to monitor particulate matter may exhibit a sensitivity to NH3 molecules when disposed to monitor an exhaust gas feedstream. A diagnostic monitoring system for evaluating efficiency of a particulate filter element may exhibit either a false-negative result or a false-positive result under certain operating conditions due to occurrence of NH3 in the exhaust gas feedstream.

SUMMARY

An internal combustion engine fluidly coupled to an exhaust aftertreatment system is described. The exhaust aftertreatment system includes a particulate filter element and a particulate matter sensor that is disposed to monitor the exhaust gas feedstream downstream relative to the particulate filter element. A method for monitoring an exhaust gas feedstream downstream relative to the particulate filter element includes determining a temperature associated with the particulate matter sensor and monitoring engine operation and the exhaust aftertreatment system. The particulate matter sensor monitors the exhaust gas feedstream. A magnitude of NH3 is determined in the exhaust gas feedstream proximal to the particulate matter sensor based upon the monitoring of the engine operation and the exhaust aftertreatment system. An initial reading is determined from the particulate matter sensor and is adjusted based upon the magnitude of NH3 in the exhaust gas feedstream proximal to the particulate matter sensor and the temperature of the particulate matter sensor. A magnitude of particulate matter in the exhaust gas feedstream is determined based upon the adjusted initial reading from the particulate matter sensor.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
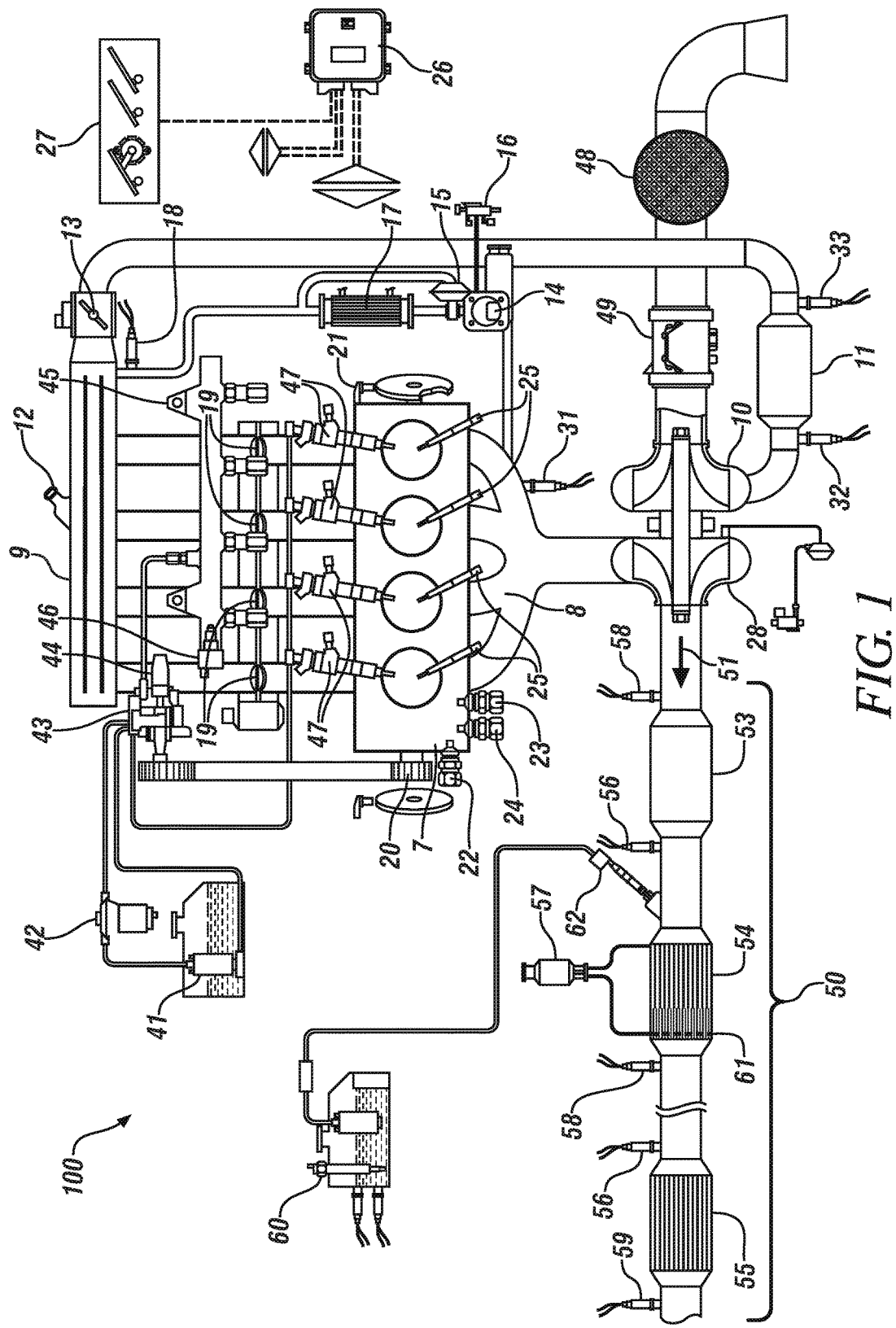
FIG. 1 schematically illustrates an internal combustion engine fluidly coupled to an exhaust gas aftertreatment system including first and second selective catalytic reduction devices (SCRs) and a particulate filter element, in accordance with the disclosure.

Referring now to the drawings, wherein the depictions are for the purpose of illustrating certain exemplary embodiments only and not for the purpose of limiting the same, FIG. 1 schematically illustrates an internal combustion engine (engine) 100 that is fluidly coupled to an exhaust aftertreatment system 50 that is arranged in accordance with an embodiment of this disclosure. The engine 100 is a multi-cylinder internal combustion engine that combusts a mixture of directly-injected fuel, intake air and recirculated exhaust gas to generate mechanical power. The engine 100 is configured as a compression-ignition engine as shown, although the concepts described herein may be employed on other engine configurations that employ embodiments of the exhaust aftertreatment system 50 described herein. The engine 100 may be employed on a ground vehicle, e.g., a passenger car, truck, agricultural vehicle or a construction vehicle, on a marine vehicle, or in a stationary setting, e.g., coupled to an electric power generator. As employed herein, the term "upstream" and related terms refer to elements that are towards an origination of a flow stream relative to an indicated location, and the term "downstream" and related terms refer to elements that are away from an origination of a flow stream relative to an indicated location.

The engine 100 preferably includes a multi-cylinder engine block 7, an intake manifold 8 for channeling intake air to the cylinders of the engine 100, and an exhaust manifold 9 for entraining exhaust gas for channeling through the exhaust aftertreatment system 50. Other unillustrated engine components and systems include pistons, crankshaft, engine head(s), intake valves, exhaust valves, camshaft(s), and variable cam phasers when employed. The engine 100 preferably operates in a four-stroke combustion cycle of repetitively-executed strokes of intake-compression-combustion-exhaust. A variable geometry turbocharger (VGT)

includes a turbine 28 that fluidly couples to the exhaust manifold 9 upstream relative to the exhaust aftertreatment system 50 in one embodiment. The engine 100 includes a plurality of direct-injection fuel injectors 47 that are arranged to directly inject fuel into individual combustion chambers. The injectors 47 may be any suitable direct-injection device, such as solenoid-activated devices in one embodiment. Fuel is supplied to the injectors 47 from a fuel storage tank via a low-pressure fuel pump 41, a fuel filter assembly 42, a high-pressure fuel pump 43, a fuel metering valve 44, a fuel rail 45 and a pressure regulating valve 46. Each of the engine cylinders preferably includes a glow plug 25. The engine 100 also includes an intake air system, which may include an intake air filter 48, a mass air flow sensor 49, a compressor 10 of the VGT, a charge air cooler 11, a throttle valve 13, a sensor 12 for monitoring boost pressure and intake air temperature, and other sensing devices as may be useful. The engine 100 may include an exhaust gas recirculation (EGR) system that fluidly channels exhaust gas from the exhaust manifold 9 to the intake manifold 8. In one embodiment, the EGR system may include an EGR valve 14, an EGR cooler 17 including a bypass valve 15, an EGR outlet temperature sensor 18, an EGR cooler inlet temperature sensor (not shown) and a vacuum switch 16. The intake manifold 8 may also include a plurality of swirl valves 19 for mixing intake air and the recirculated exhaust gas. Other engine monitoring sensors may include a crankshaft position sensor 20, a camshaft position sensor 21, a coolant temperature sensor 22, an oil level switch 23 and an oil pressure switch 24, among others. One or more engine monitoring sensors may be replaced with a suitable executable model.

An engine controller 26 monitors various sensing devices and executes control routines to command various actuators to control operation of the engine 100 in response to operator commands. Operator commands may be determined from various operator input devices, including, e.g., a pedal assembly 27 that includes, by way of example, an accelerator pedal and a brake pedal. Other sensing devices associated with engine operation may include, by way of non-limiting example only, a barometric pressure sensor (not shown), an ambient air temperature sensor (not shown), a VGT position sensor (not shown), the exhaust gas temperature sensor 31, an air charge inlet temperature sensor 32 and an air charge outlet temperature sensor 33, among others.

The exhaust aftertreatment system 50 includes a plurality of fluidly connected exhaust purifying devices for purifying engine exhaust gas prior to expulsion to ambient air. An exhaust purifying device may be any device that is configured to oxidize, reduce, filter and/or otherwise treat constituents of the exhaust gas feedstream 51, including but not limited to hydrocarbons, carbon monoxide, nitrides of oxygen (NOx), and particulate matter. In the embodiment shown, first, second and third exhaust purifying devices 53, 54 and 55, respectively, are deployed. The first and second exhaust purifying devices 53, 54 may be closely coupled to the exhaust manifold 9, i.e., located within an engine compartment. The third exhaust purifying device (catalyst) 55 may be distally located, such as in an underfloor location when employed on a ground vehicle. The first exhaust purifying device 53 may be an oxidation catalyst for oxidizing hydrocarbons and other constituents in the exhaust gas feedstream 51 in certain embodiments, and is referred to hereafter as an oxidation catalyst 53. The second exhaust purifying device 54 may be a selective catalyst reduction catalyst that includes a particulate filter element 61 for filtering particulate matter from the exhaust gas feedstream 51, and is referred to hereafter as an SCRF 54. Alternatively, the particulate filter element 61 may be contained in a separate mechanical assembly in the exhaust aftertreatment system. The third catalyst 55 may be an oxidation catalyst, or another suitable purifying device, and may be employed to oxidize NH3 that may pass through the SCRF 54. In one embodiment, the third catalyst 55 is omitted from the exhaust aftertreatment system 50.

Each of the oxidation catalyst 53, SCRF 54 and third catalyst 55 includes a ceramic or metallic substrate having flow channels that have been coated with suitable materials including, by way of non-limiting examples: platinum-group metals such as platinum, palladium and/or rhodium; other metals, such as copper; cerium; and other materials. The coated materials effect chemical reactions to oxidize, reduce, filter or otherwise treat constituents of the exhaust gas feedstream 51 under certain conditions related to temperature, flowrate, air/fuel ratio and others. The embodiment shown includes the elements of the exhaust aftertreatment system 50 in one arrangement, which is illustrative. In an alternative embodiment, the particulate filter element 61 and the oxidation catalyst may be collocated on a single substrate as part of the oxidation catalyst 53 and collocated within a single mechanical assembly. Other arrangements of the elements of the exhaust aftertreatment system 50 may be employed within the scope of this disclosure, with such arrangements including addition of other exhaust purifying devices and/or omission of one or more of the exhaust purifying devices, depending upon requirements of the specific application.

A reductant delivery system 60 including a reductant injector 62 having an injection nozzle may be positioned upstream relative to the SCRF 54 to controllably supply reductant into the exhaust gas feedstream 51 to facilitate NOx reduction in the SCRF 54. In one embodiment, the SCRF 54 may be a urea-based device, and the injected reductant may be urea. As appreciated by those skilled in the art, urea may convert to ammonia (NH3), which may be stored on the substrate of the SCRF 54, and may react with and reduce NOx molecules to form elemental nitrogen (N2) and other inert gases.

Sensors for monitoring the exhaust purifying devices of the exhaust aftertreatment system 50 may include one or multiple exhaust gas sensors 58, one or multiple particulate matter sensors 56, and a delta pressure sensor 57 for monitoring pressure drop across the SCRF 54, one or multiple temperature sensors 59, and/or other suitable sensing devices and models for monitoring the exhaust gas feedstream 51. The exhaust gas sensors 58 are preferably configured as NOx sensors, and in one embodiment may include wide-range lambda sensing capability. Such sensors and models may be arranged to monitor or otherwise determine parameters related to the exhaust gas feedstream 51 at specific locations. As such, the aforementioned sensors and/or models may be advantageously employed to monitor performance of individual ones of the exhaust purifying devices, monitor parameters associated with performance of a subset of the exhaust purifying devices, or monitor parameters associated with performance of the exhaust aftertreatment system 50. One of the exhaust gas sensors 58 is preferably arranged to monitor the exhaust gas feedstream 51 upstream relative to the oxidation catalyst 53, as shown. Alternatively, or in addition, the exhaust gas sensor 58 may be arranged to monitor the exhaust gas feedstream 51 downstream relative to SCRF 54 (as shown) or downstream of the oxidation catalyst 53 (not shown). Each of the exhaust gas sensors 58 may be fabricated as a planar-type zirconium oxide dual cell device having a sensing element and an integrated electrically-powered heating element.

In one embodiment, the particulate matter sensor 56 is a resistive electrostatic accumulator device that is exposed to exhaust gas flow in the exhaust gas feedstream 51. The resistive electrostatic accumulator device preferably includes a sensing element in the form of a pair of electrodes mounted on a dielectric substrate, and may be fabricated as a planar-type zirconium oxide dual cell device having the sensing element and an integrated electrically-powered resistive heating element. The electrodes of the sensing element are preferably proximal to each other, arranged in an intertwined configuration, and electrically isolated from each other. The electrodes preferably have interstitial elements. The heating element is preferably located on the substrate proximal to the electrodes. The heating element is suitably arranged on the substrate to generate heat that is sufficient to desorb particulate matter particles that have accumulated on the substrate in proximity of the electrodes when the heating element is activated. A temperature associated with the particulate matter sensor 56 may be determined by monitoring resistance of the heating element when it is deactivated, i.e., between sensor regeneration events. Signal outputs from the particulate matter sensor 56 may be affected by constituents in the exhaust gas feedstream 51 other than particulate matter. By way of example, the particulate matter sensor 56 may have a sensitivity to presence of NH3 in the exhaust gas feedstream 51. Other details related to the particulate matter sensor 56 are known to one having ordinary skill in the art.

Figure 2:
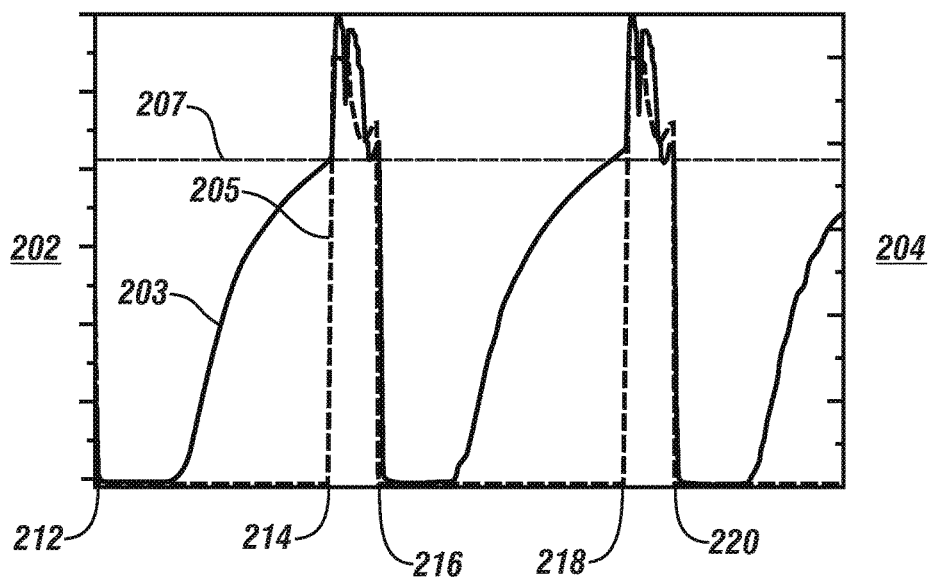
FIG. 2 graphically shows electrical signals associated with operation of an embodiment of the particulate matter sensor, including magnitude of a sensor output signal and magnitude of heater voltage shown in relation to time, in accordance with the disclosure.

FIG. 2 graphically shows electrical signals associated with operation of an embodiment of the particulate matter sensor 56 that is described with reference to FIG. 1, including magnitude of a sensor output signal 202 and magnitude of heater voltage 204 shown on vertical axes in relation to time 210. In operation, the particulate matter sensor 56 is exposed to flow of exhaust gas, and a leakage current, indicated by line 203 is monitored between the electrodes employing a suitable current sensor. Initially, as indicated at timepoint 212, the leakage current is at a minimum state. As particulate matter particles are deposited and accumulate on the sensor substrate, e.g., through an adsorption process, the leakage current 203 increases due to conductivity of the accumulating particulate matter, eventually achieving a threshold current at timepoint 214, which is indicated by line 205. When the leakage current 203 achieves the threshold current 207, a controller electrically activates the heating element, as indicated by the heater voltage 205. Activation of the heating element serves to regenerate the particulate matter sensor 56 by desorption of the accumulated particulate matter particles from the substrate. The heating element is deactivated at timepoint 216, which is coincident with a decrease in the leakage current 203 to its minimum state. The process repeats, as the leakage current 203 increases with accumulation of particulate matter particles on the sensor substrate, achieves the threshold current 207 at timepoint 218, and activates the heating element between timepoints 218 and 220. A time period between regeneration events is monitored, e.g., between timepoints 214 and 218, and collected to determine a frequency of regeneration. The frequency of regeneration directly correlates to magnitude of particulate matter in the exhaust gas feedstream 51. Thus, as the magnitude of particulate matter in the exhaust gas feedstream 51 increases, the frequency of regeneration of the particulate matter sensor 56 increases. The frequency of regeneration may be employed by a monitoring algorithm to detect occurrence of a fault, such as a fault in the particulate filter element 61 of the SCRF 54 described with reference to FIG. 1.

The particulate matter sensor 56 may exhibit sensitivity to exhaust gas constituents other than particulate matter, wherein such sensitivity may manifest itself by changing the time period between sensor regeneration events, and thus changing the frequency of sensor regeneration. By way of example, the signal output from an embodiment of the particulate matter sensor 56 may be affected by magnitude of NH3 in the exhaust gas feedstream 51. Furthermore, this sensitivity may be further complicated by temperature of the exhaust gas feedstream 51. Table 1, below, indicates effects of temperature (TM-Temp [° C.]) and NH3 concentration (ppm) in the exhaust gas feedstream 51 upon the sensitivity of the signal output of the particulate matter sensor 56 for an embodiment of the particulate matter sensor 56. The sensitivity of the signal output of the particulate matter sensor 56 may be determined in relation to a signal output from the particulate matter sensor 56 that is reading 0 ppm NH3. The contents of Table 1 may be reduced to practice as an array of values that can be predetermined and stored in a non-volatile memory device that can be interrogated by a controller and employed as a correction table, as described with reference to FIG. 4.

TABLE 1

| TM-Temp [° C.] | NH3 Concentration (ppm) | | |
|---|---|---|---|
| | 50 | 100 | 250 |
| | Change in Sensitivity (%) relative to 0 ppm NH3 | | |
| 150 | 16 | 29 | 49 |
| 175 | 15 | 27 | 43 |
| 200 | 14 | 25 | 36 |
| 235 | 12 | 21 | 25 |
| 270 | 11 | 17 | 14 |

Engine control includes controlling various engine operating parameters, including controlling preferred engine control states to minimize various exhaust gas constituents through chemical reaction processes that include, by way of non-limiting examples, oxidation, reduction, filtering, and selective reduction. Other engine control states include controlling operating parameters to warm-up the engine 100 and transfer heat or otherwise warm up various ones of the first oxidation catalyst 53, the SCRF 54 and the third catalyst 55 so as to effect efficacious operation thereof.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or control routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and that may include monitoring or otherwise determining states of parameters and updating the states of the parameters during execution of a routine or between iterations of execution of the routine.

Figure 3:
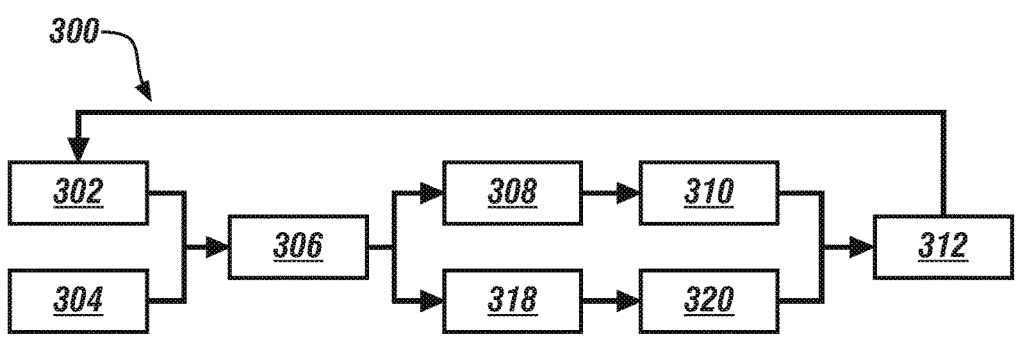
FIG. 3 schematically shows a first routine for enabling particulate matter monitoring in an exhaust gas feedstream of an internal combustion engine, in accordance with the disclosure.

FIG. 3 schematically shows a first routine 300 for enabling particulate matter monitoring in an exhaust gas feedstream of an internal combustion engine, wherein one embodiment of a suitable internal combustion engine 100 and exhaust gas feedstream 51 is described with reference to FIG. 1. The first routine 300 periodically executes during operation of the internal combustion engine 100, preferably until a diagnostic routine 400 is enabled. One embodiment of the diagnostic routine 400 is described with reference to FIG. 4. In one embodiment, the first routine 300 executes in the engine controller 26.

During execution of the first routine 300, the engine controller 26 monitors engine operating parameters and parameters associated with the particulate matter sensor 56, and determines a temperature of the particulate matter sensor 56 (302) and a magnitude of NH3 in the exhaust gas feedstream 51 proximal to the particulate matter sensor 56 (304). The temperature of the particulate matter sensor 56 may be determined based upon a magnitude of resistance of its heating element, or using another suitable monitoring routine. The magnitude of NH3 in the exhaust gas feedstream 51 proximal to the particulate matter sensor may be determined by executing a simulation model that accounts for operating parameters related to the internal combustion engine 100 and exhaust gas feedstream 51 to determine the magnitude of NH3. Simulation models are known to those skilled in the art, and thus not described in detail herein.

The magnitude of NH3 in the exhaust gas feedstream 51 proximal to the particulate matter sensor and the temperature of the particulate matter sensor 56 are evaluated in relation to a diagnostic inhibit curve (306). The diagnostic inhibit curve is an application-specific analysis that evaluates the magnitude of NH3 in the exhaust gas feedstream 51 proximal to the particulate matter sensor and the temperature of the particulate matter sensor 56. The diagnostic inhibit curve is employed to determine a likelihood that a signal output from the particulate matter sensor 56 accurately reflects an actual magnitude of particulate matter in the exhaust gas feedstream 51 proximal to the particulate matter sensor, with or without employing a corrective routine. The corrective routine employs the magnitude of NH3 in the exhaust gas feedstream 51 proximal to the particulate matter sensor 56 and the temperature of the particulate matter sensor 56 to adjust the signal output from the particulate matter sensor 56 to accurately indicate the magnitude of particulate matter in the exhaust gas feedstream 51. One embodiment of details employed in the corrective routine are described with reference to Table 1.

When the magnitude of NH3 in the exhaust gas feedstream 51 proximal to the particulate matter sensor 56 is greater than a threshold value indicated by the diagnostic inhibit curve (308), execution of the diagnostic routine 400 is inhibited (310). The routine 300 preferably waits for execution of a regeneration routine for the particulate matter sensor 56 (312) and re-executes.

When the magnitude of NH3 in the exhaust gas feedstream 51 proximal to the particulate matter sensor 56 is less than a threshold value indicated by the diagnostic inhibit curve (318), execution of the diagnostic routine 400 is enabled (320).

Figure 4:
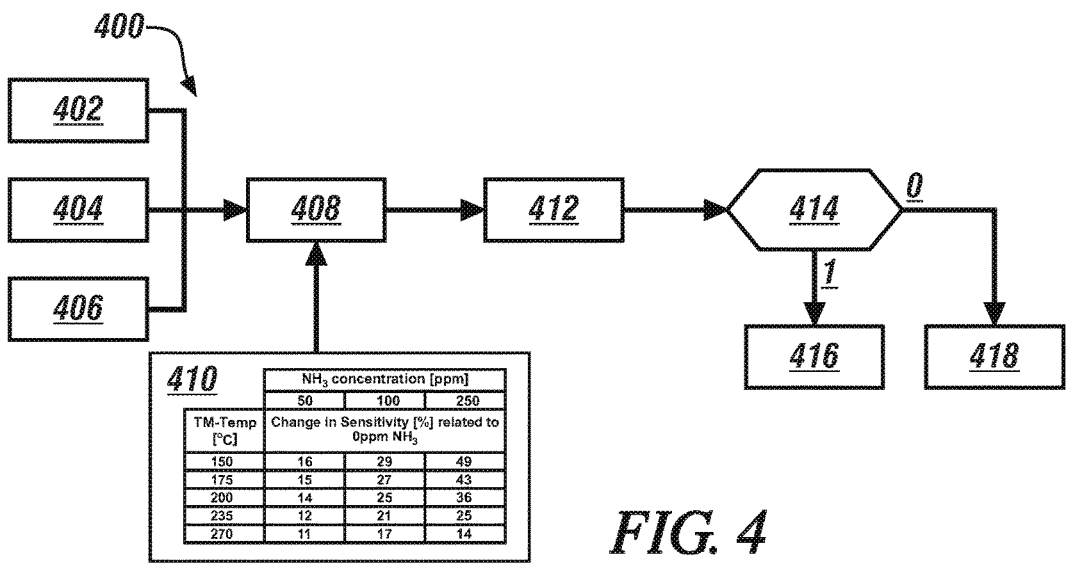
FIG. 4 schematically shows a diagnostic routine for monitoring a particulate filter element in an exhaust gas feedstream employing information from a particulate matter sensor, in accordance with the disclosure.

FIG. 4 schematically shows one embodiment of the diagnostic routine 400 associated with monitoring a particulate filter element in an exhaust gas feedstream employing an embodiment of a particulate matter sensor, wherein one embodiment of a suitable internal combustion engine 100 that includes a particulate filter element 61 and a particulate matter sensor 56 for purifying and monitoring an exhaust gas feedstream 51 is described with reference to FIG. 1.

During execution of the diagnostic routine 400, the engine controller 26 monitors engine operating parameters and parameters associated with the particulate matter sensor 56, and determines a temperature of the particulate matter sensor 56 (402) and a magnitude of NH3 in the exhaust gas feedstream 51 proximal to the particulate matter sensor 56 (404). The temperature of the particulate matter sensor 56 may be determined based upon a magnitude of resistance of its heating element, or using another suitable monitoring routine. The magnitude of NH3 in the exhaust gas feedstream 51 proximal to the particulate matter sensor may be determined by executing a simulation model that accounts for operating parameters related to the internal combustion engine 100 and exhaust gas feedstream 51 to determine the magnitude of NH3. Simulation models are known to those skilled in the art, and thus not described in detail herein.

An initial reading from the particulate matter sensor, e.g., a time period between regeneration events is also monitored (406). A correction table (410) that is analogous to Table 1 may be employed to adjust the initial reading to determine an adjusted sensor time (408). This may include increasing the initial reading from the particulate matter sensor based upon the magnitude of NH3 in the exhaust gas feedstream 51 proximal to the particulate matter sensor 56 and the temperature of the particulate matter sensor 56, wherein a magnitude of the increase in the initial reading is determined based upon the magnitude of NH3 in the exhaust gas feedstream 51. This includes increasing the magnitude of the increase in the initial reading with an increase in the magnitude of NH3 in the exhaust gas feedstream 51, and decreasing the magnitude of the increase in the initial reading with a decrease in the magnitude of NH3 in the exhaust gas feedstream 51. This may also include increasing the initial reading from the particulate matter sensor 56 based upon the magnitude of NH3 in the exhaust gas feedstream 51 proximal to the particulate matter sensor and the temperature of the particulate matter sensor, wherein a magnitude of the increase in the initial reading is determined based upon the temperature of the particulate matter sensor 56. This includes decreasing the magnitude of the increase in the initial reading with an increase in the temperature of the particulate matter sensor 56, and increasing the magnitude of the initial reading with a decrease in the temperature of the particulate matter sensor 56. As such, the initial reading from the particulate matter sensor 56 may be adjusted based upon the magnitude of NH3 in the exhaust gas feedstream 51 proximal to the particulate matter sensor and the temperature of the particulate matter sensor. A magnitude of particulate matter in the exhaust gas feedstream 51 can be determined based upon the adjusted initial reading from the particulate matter sensor 56 (412). A diagnostic routine can execute to evaluate the magnitude of particulate matter in the exhaust gas feedstream 51 as indicated by the particulate matter sensor 56 (414). When the magnitude of particulate matter in the exhaust gas feedstream 51 is greater than a threshold magnitude (414)(1), a fault associated with the particulate filter element 61 may be indicated (416). When the magnitude of particulate matter in the exhaust gas feedstream 51 is less than the threshold magnitude (414)(0), no fault is indicated (418). Either way (416, 418), the execution of the diagnostic routine 400 preferably ends for the present vehicle trip. The concepts described herein serve to modify and/or inhibit execution of a particulate filter diagnostics routine when NH3 is present to avoid false-positive results that may be due to cross-sensitivity of an embodiment of a particulate matter sensor to NH3.

Those having ordinary skill in the art will recognize that the teachings described herein are in terms of functional and/or logical block components and/or various processing steps. It should be realized that such block components may be composed of hardware, software, and/or firmware components that are configured to perform the specified functions. That may include a vehicle computing system communicating with the one or more modules that may be implemented through a computer algorithm, machine executable code, non-transitory computer-readable medium, or software instructions programmed into a suitable programmable logic device(s) of the vehicle, such as the one or more modules, a server in communication with the vehicle computing system, a mobile device communicating with the vehicle computing system and/or server, other controller in the vehicle, or a combination thereof.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for monitoring an exhaust gas feedstream downstream relative to a particulate filter element, wherein the particulate filter element is disposed in an exhaust aftertreatment system for an internal combustion engine, and wherein a particulate matter sensor is disposed to effect the monitoring, the method comprising:

determining a temperature associated with the particulate matter sensor;

monitoring engine operation and the exhaust aftertreatment system;

monitoring, via the particulate matter sensor, the exhaust gas feedstream;

determining a magnitude of ammonia in the exhaust gas feedstream proximal to the particulate matter sensor based upon the monitoring of the engine operation and the exhaust aftertreatment system;

determining an initial reading from the particulate matter sensor;

adjusting the initial reading from the particulate matter sensor based upon the magnitude of ammonia in the exhaust gas feedstream proximal to the particulate matter sensor and the temperature of the particulate matter sensor;

determining a magnitude of particulate matter in the exhaust gas feedstream based upon the adjusted initial reading from the particulate matter sensor; and detecting, via a controller, a fault in the particulate filter element when the magnitude of particulate matter in the exhaust gas feedstream is greater than a threshold.

2. The method of claim 1, comprising increasing the initial reading from the particulate matter sensor based upon the magnitude of ammonia in the exhaust gas feedstream proximal to the particulate matter sensor and the temperature of the particulate matter sensor, wherein a magnitude of the increase in the initial reading is determined based upon the magnitude of ammonia in the exhaust gas feedstream.

3. The method of claim 2, wherein the magnitude of the increase in the initial reading is increased with an increase in the magnitude of ammonia in the exhaust gas feedstream.

4. The method of claim 2, wherein the magnitude of the increase in the initial reading is decreased with a decrease in the magnitude of ammonia in the exhaust gas feedstream.

5. The method of claim 1, comprising increasing the initial reading from the particulate matter sensor based upon the magnitude of ammonia in the exhaust gas feedstream proximal to the particulate matter sensor and the temperature of the particulate matter sensor, wherein a magnitude of the increase in the initial reading is determined based upon the temperature of the particulate matter sensor.

6. The method of claim 5, wherein the magnitude of the increase in the initial reading is decreased with an increase in the temperature of the particulate matter sensor.

7. The method of claim 5, wherein the magnitude of the increase in the initial reading is increased with a decrease in the temperature of the particulate matter sensor.

8. The method of claim 1, comprising decreasing the magnitude of particulate matter in the exhaust gas feedstream indicated by the particulate matter sensor based upon the magnitude of ammonia in the exhaust gas feedstream proximal to the particulate matter sensor and the temperature of the particulate matter sensor.

9. The method of claim 1, further comprising executing a routine to monitor the particulate filter element when the magnitude of ammonia in the exhaust gas feedstream proximal to the particulate matter sensor is less than a threshold.

10. The method of claim 1, further comprising inhibiting execution of a routine to monitor the particulate filter element when the magnitude of ammonia in the exhaust gas feedstream proximal to the particulate matter sensor is greater than a threshold.

* * * * *